United States Patent
Peng et al.

(10) Patent No.: US 12,041,154 B2
(45) Date of Patent: Jul. 16, 2024

(54) CLOCK DISTRIBUTION METHOD AND APPARATUS IN NETWORK

(71) Applicant: Telefonaktiebolaget LM Ericsson (publ), Stockholm (SE)

(72) Inventors: Yao Peng, Beijing (CN); Jun Wang, Beijing (CN); Jianhui Wu, Beijing (CN); Guoliang Gao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 387 days.

(21) Appl. No.: 17/426,546

(22) PCT Filed: Nov. 8, 2019

(86) PCT No.: PCT/CN2019/116732
§ 371 (c)(1),
(2) Date: Jul. 28, 2021

(87) PCT Pub. No.: WO2020/155738
PCT Pub. Date: Aug. 6, 2020

(65) Prior Publication Data
US 2022/0094515 A1    Mar. 24, 2022

(30) Foreign Application Priority Data

Jan. 28, 2019   (WO) ................ PCT/CN2019/073427

(51) Int. Cl.
*H04L 7/00*     (2006.01)
*H04J 3/06*     (2006.01)
(52) U.S. Cl.
CPC .......... *H04L 7/0008* (2013.01); *H04J 3/0667* (2013.01); *H04L 7/0016* (2013.01)
(58) Field of Classification Search
CPC ....... H04L 7/0008; H04L 7/0016; H04L 7/10; H04L 69/28; H04J 3/0667; H04J 3/0641;
(Continued)

(56) References Cited

U.S. PATENT DOCUMENTS

| | | | | |
|---|---|---|---|---|
| 5,481,573 A | * | 1/1996 | Jacobowitz | ............. H03L 7/093 331/25 |
| 2010/0085989 A1 | * | 4/2010 | Belhadj | ................. H04J 3/0667 370/503 |

(Continued)

FOREIGN PATENT DOCUMENTS

| | | |
|---|---|---|
| CN | 102237941 A | 11/2011 |
| CN | 104049525 B | 4/2016 |

(Continued)

OTHER PUBLICATIONS

Author Unknown, "IEEE Standard for a Precision Clock Synchronization Protocol for Networked Measurement and Control Systems," IEEE Instrumentation and Measurement Society, IEEE Std 1588, Jul. 24, 2008, 289 pages.

(Continued)

*Primary Examiner* — Rasheed Gidado
(74) *Attorney, Agent, or Firm* — Withrow & Terranova, PLLC

(57) ABSTRACT

The present disclosure relates to a clock distribution method and apparatus in a network. A method performed at a clock distribution apparatus comprises: receiving a first clock signal; receiving a second clock signal; calculating an offset difference between the first clock signal and the second clock signal; compensating the second clock signal, based on the offset difference; and outputting a clock signal, based on the compensated second clock signal. The offset difference between the first clock signal and the second clock signal is calculated and used to compensate the second clock signal. The switching of the clock signal will be smoother for the downstream.

15 Claims, 11 Drawing Sheets

(58) Field of Classification Search
CPC ...... H04J 3/0644; H04J 3/0697; H04J 3/0635; H04J 3/0658; H04J 3/0679
See application file for complete search history.

(56) References Cited

U.S. PATENT DOCUMENTS

| | | | | |
|---|---|---|---|---|
| 2010/0272216 | A1* | 10/2010 | Liebowitz | H04L 7/0338 327/2 |
| 2012/0083304 | A1* | 4/2012 | Yang | H04W 56/0035 455/507 |
| 2013/0227172 | A1 | 8/2013 | Zheng et al. | |
| 2014/0198810 | A1* | 7/2014 | Jones | G06F 1/10 370/507 |
| 2016/0238999 | A1 | 8/2016 | Dougan et al. | |
| 2016/0359610 | A1* | 12/2016 | Karthik | H04J 3/0664 |
| 2019/0393879 | A1* | 12/2019 | Pi | H03L 7/091 |

FOREIGN PATENT DOCUMENTS

| | | |
|---|---|---|
| CN | 106656392 A | 5/2017 |
| CN | 107046449 A | 8/2017 |
| CN | 208337594 U | 1/2019 |
| EP | 2908452 A1 | 8/2015 |
| WO | 2012174892 A1 | 12/2012 |

OTHER PUBLICATIONS

Author Unknown, "Series G: Transmission Systems and Media, Digital Systems and Networks; Packet over Transport aspects—Synchonization, quality and availability targets; Series Y: Global Information Infrastructure, Internet Protocol Aspects and Next-Generation Networks, Internet of Things and Smart Cities; Precision time protocol telecom profile for phase/time sunchonization with partial timing support from the network," ITU-T Telecommunication Standardization Sector of ITU, ITU-T G.8275.2 / Y.1369.2, Jun. 2016, 46 pages.

International Search Report and Written Opinion for International Patent Application No. PCT/CN2019/116732, mailed Jan. 23, 2020, 6 pages.

International Search Report and Written Opinion for International Patent Application No. PCT/CN2019/073427, mailed Oct. 30, 2019, 6 pages.

Extended European Search Report for European Patent Application No. 19914023.7, mailed Feb. 28, 2022, 4 pages.

Examination Report for European Patent Application No. 19914023.7, mailed Mar. 14, 2022, 6 pages.

* cited by examiner

CLOCK DISTRIBUTION METHOD AND APPARATUS IN NETWORK

This application is a 35 U.S.C. § 371 national phase filing of International Application No. PCT/CN2019/116732, filed Nov. 8, 2019, which claims the benefit of International Application No. PCT/CN2019/073427, filed Jan. 28, 2019, the disclosures of which are incorporated herein by reference in their entireties.

TECHNICAL FIELD

The present disclosure relates generally to the technology of communication network, and in particular, to a clock distribution method and apparatus in a network.

BACKGROUND

In a communication network, the clock synchronization between different apparatus is very important for a collaboration and communication with each other. Clock distribution apparatus cascaded in the network distribute the clock signal received from clock source to each apparatus in the network, such as a terminal device.

One clock distribution apparatus may receive clock signals from more than one clock sources, or from one clock source through different transmission path in the communication network. Due to the state of the clock sources or the network, the priority of one clock signal being distributed may change, and another clock signal will be distributed instead.

During the switching of the clock signals to be distributed, there will be a jump of characteristic of the clock signal, such as phase/time. Downstream apparatuses, which are sensitive to the characteristic of the clock signal will be affected. Sometimes, these downstream apparatuses lose connection from the network during switching of the clock signal.

SUMMARY

Certain aspects of the present disclosure and their embodiments may provide solutions to these or other challenges. There are, proposed herein, various embodiments which address one or more of the issues disclosed herein.

A first aspect of the present disclosure provides a method performed at a clock distribution apparatus, comprising: receiving a first clock signal; receiving a second clock signal; calculating an offset difference between the first clock signal and the second clock signal; compensating the second clock signal, based on the offset difference; and outputting a clock signal, based on the compensated second clock signal.

In embodiments of the present disclosure, the first clock signal is from a first clock source, the second clock signal is from a second clock source. The method may further comprise: determining to switch from the first clock source to the second clock source. Compensating the second clock signal, based on the offset difference comprises: generating an output message including information about the second clock signal and the offset difference. Outputting the clock signal, based on the compensated second clock signal comprises: outputting the output message.

In embodiments of the present disclosure, the information about the second clock signal indicates a phase value of the second clock signal.

In embodiments of the present disclosure, the output message comprises: a Precision Time Protocol (PTP) message. The offset difference is included in a Correction Field of the PTP message.

In embodiments of the present disclosure, wherein the first clock signal is from a third clock source through a first transmission path in a network; the second clock signal is from the third clock source through a second transmission path in the network. The method may further comprise: determining whether a network connection between the third clock source and the clock distribution apparatus is switched from the first transmission path in the network to the second transmission path in the network. Compensating the second clock signal, based on the offset difference comprises: compensating a local clock with the offset difference, when it is determined that the network connection between the third clock source and the clock distribution apparatus is switched from the first transmission path in the network to the second transmission path in the network.

In embodiments of the present disclosure, it is determined that the network connection between the third clock source and the clock distribution apparatus is switched from the first transmission path in the network to the second transmission path in the network, when the first transmission path in the network is not valid and the second transmission path in the network is stable during a predetermined time period.

In embodiments of the present disclosure, the method may further comprise: comparing the offset difference with a predetermined threshold. The local clock is compensated with the offset difference, when it is determined that the network connection between the third clock source and the clock distribution apparatus is switched from the first network transmission path to the second network transmission path and the offset difference is bigger than the predetermined threshold.

In embodiments of the present disclosure, calculating the offset difference between the first clock signal and the second clock signal comprises: obtaining a first offset of the first clock signal, and a second offset of the second clock signal; and obtaining the offset difference, based on the first offset and the second offset.

In embodiments of the present disclosure, wherein calculating the offset difference between the first clock signal and the second clock signal comprises: obtaining a first offset of the first clock signal, and a second offset of the second clock signal; obtaining a candidate offset difference, based on the first offset and the second offset; storing the candidate offset difference; obtaining a plurality of stored candidate offset differences; obtaining a mean value, or a last value of the stored candidate offsets, as the offset difference to compensate the second clock signal, when the plurality of candidate offset differences are located in a predetermined scope; and returning to a step of obtaining a first offset of the first clock signal, and a second offset of the second clock signal, when the plurality of candidate offset differences are not located in the predetermined scope.

In embodiments of the present disclosure, the method further comprises: reducing the offset difference by a predefined value or a predefined rate. Compensating the second clock signal with the offset difference comprises: compensating the second clock signal with the reduced offset difference.

In embodiments of the present disclosure, the predefined value is configurable.

In embodiments of the present disclosure, the offset difference comprises: a phase offset difference.

In embodiments of the present disclosure, the clock distribution apparatus comprises: a boundary clock apparatus.

In embodiments of the present disclosure, the boundary clock apparatus comprises: a Partial-Support Telecom Boundary Clock (T-BC-P) apparatus.

In embodiments of the present disclosure, the first clock source comprises: a Grandmaster (GM) apparatus. The second clock source comprises: a Grandmaster (GM) apparatus.

In embodiments of the present disclosure, the clock distribution apparatus determines to switch from the first clock source to the second clock source, based on a Best Master Clock Algorithm (BMCA).

A second aspect of the present disclosure provides a clock distribution apparatus, comprising: a processor; and a memory, containing instructions executable by the processor. The clock distribution apparatus is operative to: receive a first clock signal; receive a second clock signal; calculate an offset difference between the first clock signal and the second clock signal; compensate the second clock signal, based on the offset difference; and output a clock signal, based on the compensated second clock signal.

In embodiments of the present disclosure, the clock distribution apparatus is further operative to implement any method above mentioned.

A third aspect of the present disclosure provides a clock distribution apparatus, comprising: a PTP packet receiver and sender, configured to receive a first clock signal, and receive a second clock signal; an offset difference calculator, configured to calculate an offset difference between the first clock signal and the second clock signal; an offset difference compensator, configured to compensate the second clock signal, based on the offset difference. The PTP packet receiver and sender is further configured to output a clock signal, based on the compensated second clock signal.

In embodiments of the present disclosure, the clock distribution apparatus is further configured to implement any method above mentioned.

A fourth aspect of the present disclosure provides a computer readable storage medium having a computer program stored thereon, the computer program executable by a device to cause the device to carry out any method above mentioned.

According to embodiments of the present disclosure, a switching of the clock signal, due to a change of either a clock source or a transmission path will be smoothly handled by the clock distribution apparatus. The influence to the downstream apparatus will be reduced.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
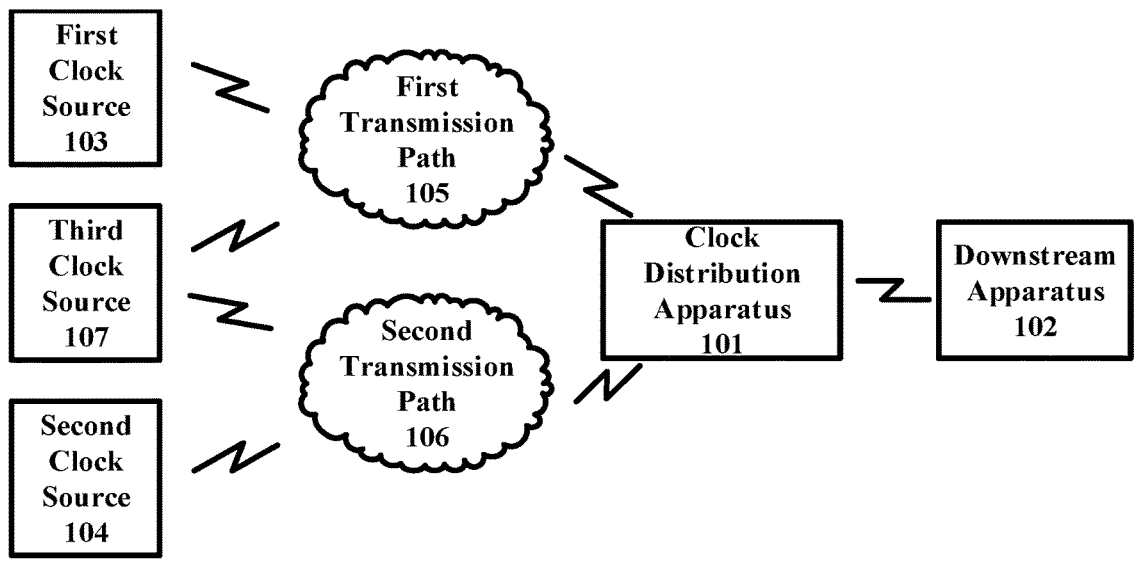
FIG. 1 is an exemplary block diagram showing a network, in which a method according to embodiments of the present disclosure is implemented.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on.

Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "apparatus" herein may refer to any end device that can access a communication network and receive services therefrom. By way of example and not limitation, the apparatus comprises a terminal device, and further the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 is an exemplary block diagram showing a network, in which a method according to embodiments of the present disclosure is implemented.

As shown in FIG. 1, a clock distribution apparatus 101 may receive clock signals from more than one clock sources, wherein one clock signal from the clock source with highest priority is distributed to downstream apparatus 102. Due to the state of the clock source or the network, the priority may change, and another clock signal will be distributed.

For example, the clock distribution apparatus 101 may receive a first clock signal from the first clock source 103, through the first transmission path 105 in a network, and may receive a second clock signal from the second clock source 104, through the second transmission path 106 in the network. As an example, the priority may change from the first clock source 103 to the second clock source 104. Thus, the second clock signal will replace the first clock signal.

Alternatively, the clock distribution apparatus 101 may receive a first clock signal from the third clock source 107, through the first transmission path 105 in a network, and may receive a second clock signal from the third clock source 107, through the second transmission path 106 in the network. As an example, a network connection between the third clock source 107 and the clock distribution apparatus 101 may be switched from the first transmission path 105 in the network to the second transmission path 106 in the network. Then, the second clock signal will replace the first clock signal.

During the switching of the clock signals to be distributed, there will be a jump of characteristic of the clock signal, such as phase/time. Downstream apparatus 102 may be affected. When the downstream apparatus 102 is sensitive to the characteristic of the clock signal, it may lose connection from the network during switching of the clock signal.

More specific example is assumed below for a more illustrative description, but it is not limitation to the present disclosure.

A specific architecture according to ITU-T G.8275.2/ Y.1369.2 (June 2016) profile may be taken as example, wherein ITU-T refers to International Telecommunication Union-Telecommunication Standardization Sector. The distribution of phase/time with precision time support (PTS) from the network is allowed in such specific architecture. The profile bases on the PTP defined in IEEE 1588-2008, and works in the unicast mode only. IEEE refers to Institute of Electrical and Electronics Engineers.

According to ITU-T G.8275.2/Y.1369.2 (June 2016) profile, a clock distribution apparatus, such as Partial-Support Telecom Boundary Clock (T-BC-P) is a boundary clock with multiple PTP ports connecting to multiple clock sources, such as Grandmaster (GM). One of these ports may be Slave, and other ports may have a state of "Passive" or "Master", which is decide according to BMCA (best master clock algorithm). The Slave port will immediately calculate the phase/time which is distributed by upstream GM, and the phase/time will distribute to downstream clock via the Master ports. If the T-BC-P gets a new GM with higher priority via another PTP port, it will be new Slave port, and the local phase/time will be adjusted according to new GM, then this new phase/time will pass to downstream clock.

The delay on the PTP packet transmission path is a key factor that will affect the phase calculation. The second GM with higher priority will become active master immediately according to the BMCA decision. Compared with the last GM, there will involve different path delay, it will cause the phase gap. This phase gap distributes to the downstream when Slave ports switchover, and the phase jump can be seen on downstream clock. If the downstream device is sensitive to the phase/time. This may cause a problem which disturbs the business.

See FIG. 1, firstly, the clock distribution apparatus 101 is synchronizing to the first clock source 103 and getting the phase/time from the first clock source 103. It is assumed that there is 20 ns delay introduced on the first network transmission path 105. Such delay may cause a phase offset of a clock signal in the clock distribution apparatus 101, which is also 20 ns.

Then, the second clock source 104 with higher priority builds up the connection with the clock distribution apparatus 101, the clock distribution apparatus 101 will switch to second clock source 104 directly according to a section of "6.7 Alternate BMCA, telecom slave model and master selection process" which is defined in a "Rec. ITU-T G.8275.2/Y.1369.2 (June 2016)".

It is assumed that there is another delay on the second network transmission path 106, which is 2000 ns. Here a phase gap happens, due to the first clock source 103 and the second clock source 104. The clock distribution apparatus 101 will have a 1980 ns phase jump on local phase/time and will distribute it to the downstream apparatus 102 immediately.

The downstream apparatus 102 will be introduced with a 1980 ns phase jump, even it is synchronized to a clock source, through the clock distribution apparatus 101 all the time.

The 1980 ns phase jump might be too large for the downstream apparatus 102, thus, the operation of the downstream apparatus 102 might be affected. Particularly, the downstream apparatus 102 might lose connection from the network during switching of the clock signal.

As shown in FIG. 1, when the clock source (such as the third clock source 107) is not changed, a delay variation on the PTP packet transmission path is still a key factor that will affect the phase calculation. If the transmission path is suddenly changed (e.g. from the first transmission path 105 to the second transmission path 106), for example due to a switch to any backup network devices, the delay variation will suddenly change according to the new transmission path. And the delay variation value will take effect at the clock phase calculation. For example, an offset of phase between a clock source and the clock distribution apparatus will change suddenly and greatly. The clock will distribute the phase with such big changed value to its downstream. If the downstream device is sensitive to the phase/time. This may also cause a problem which disturbs the business.

FIG. 1 shows only one clock distribution apparatuses 101, however, it should be understood that there may be more than one clock distribution apparatuses in serial, between a downstream apparatus 102 and a clock source.

Figure 2:
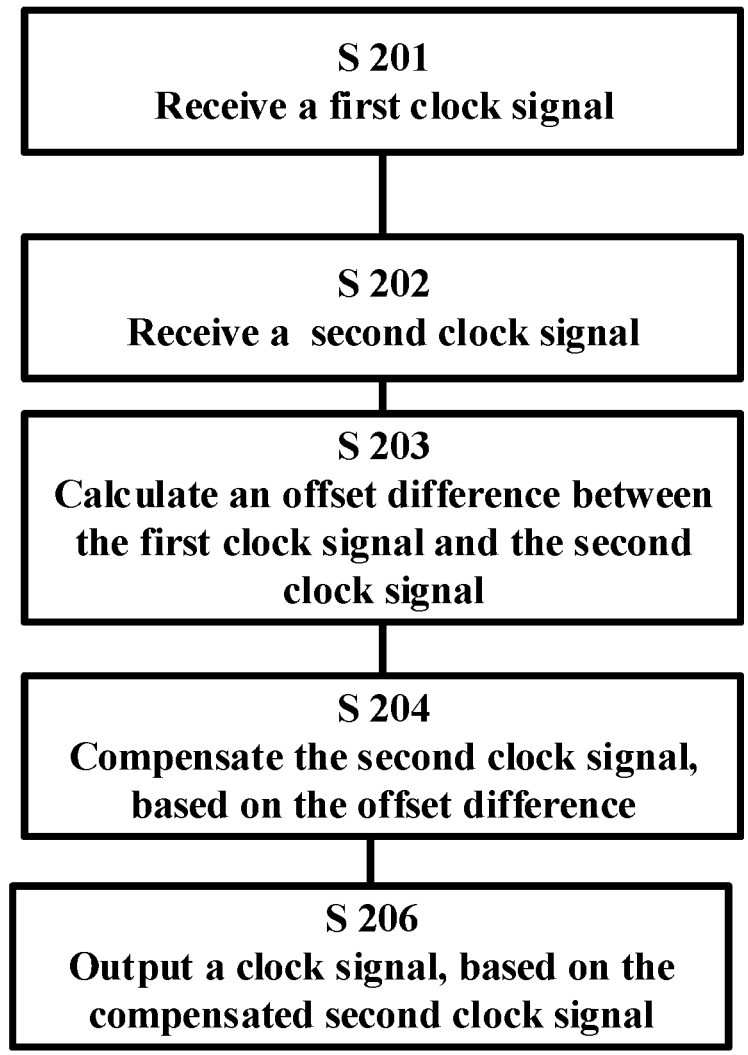
FIG. 2 is an exemplary flow chart showing a method performed at the clock distribution apparatus according to embodiments of the present disclosure.

FIG. 2 is an exemplary flow chart showing a method performed at the clock distribution apparatus according to embodiments of the present disclosure.

As shown in FIG. 2, a method performed at a clock distribution apparatus comprises: S201, receiving a first clock signal; S202, receiving a second clock signal; S203, calculating an offset difference between the first clock signal and the second clock signal; S204, compensating the second clock signal, based on the offset difference; and S206, outputting a clock signal, based on the compensated second clock signal.

According to embodiments of the present disclosure, the second clock signal is not directly transferred by the clock distribution apparatuses 101. The offset difference between the first clock signal and the second clock signal is calculated and used to compensate the second clock signal. Then, the compensated second clock signal is transferred to the downstream apparatus 102. The switching of the clock signal will be smoother for the downstream apparatus 102.

Namely, the phase jump may be detected and compensated in the clock distribution apparatuses 101. The downstream apparatus 102 may not be affected by the phase jump.

According to above description, this disclosure raises a method to compensate the phase offset in the PTP packet streams dynamically and continuously base on the active one. It eliminates the influence of phase jump caused by switchover from one packet stream (GM) to another stream (GM), or from one transmission path to another transmission path. Here we give a detailed description.

Figure 3:
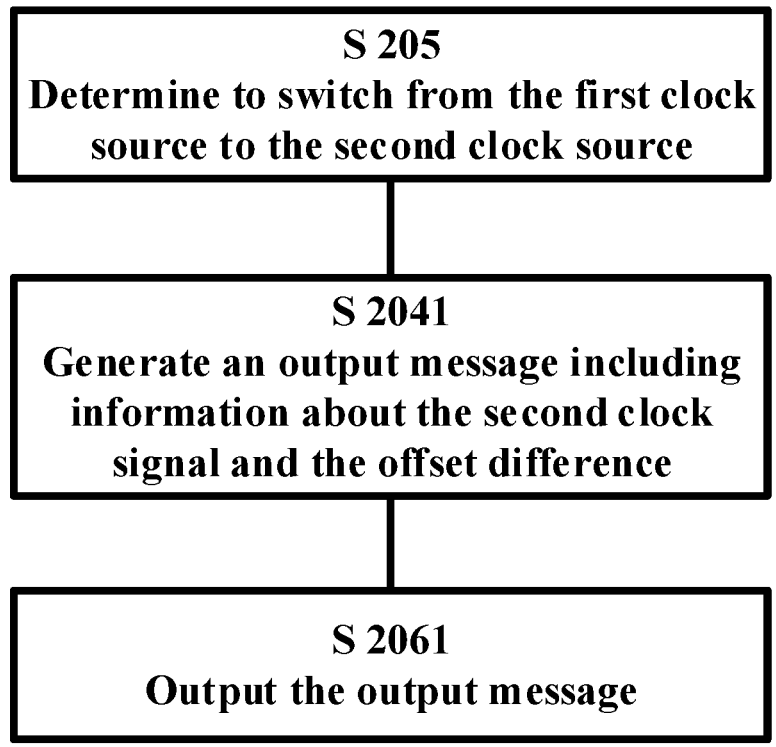
FIG. 3 is an exemplary flow chart showing exemplary substeps of method as shown in FIG. 2.

FIG. 3 is a block diagram showing an output message for the second clock signal.

In embodiments of the present disclosure, the first clock signal may be from a first clock source 103; and the second clock signal may be from a second clock source 104.

As shown in FIG. 3, the method may further comprise: step S205, determining to switch from the first clock source to the second clock source. In embodiments of the present disclosure, the clock distribution apparatus may determine to switch from the first clock source to the second clock source, based on a Best Master Clock Algorithm (BMCA).

In embodiments of the present disclosure, the step S204, compensating the second clock signal, based on the offset difference may comprise: S2041, generating an output message including information about the second clock signal and the offset difference. The step S206, outputting a clock signal, based on the compensated second clock signal may comprise: S2061, outputting the output message.

According to embodiments of the present disclosure, the second clock signal itself, which needs to be transferred by the clock distribution apparatuses 101, is not changed. Only an extra information about the offset difference is added. Thus, the compatibility of the embodiments of the present disclosure is improved, without amending existing transferring procedure of the clock signal in the clock distribution apparatuses 101.

Figure 4:
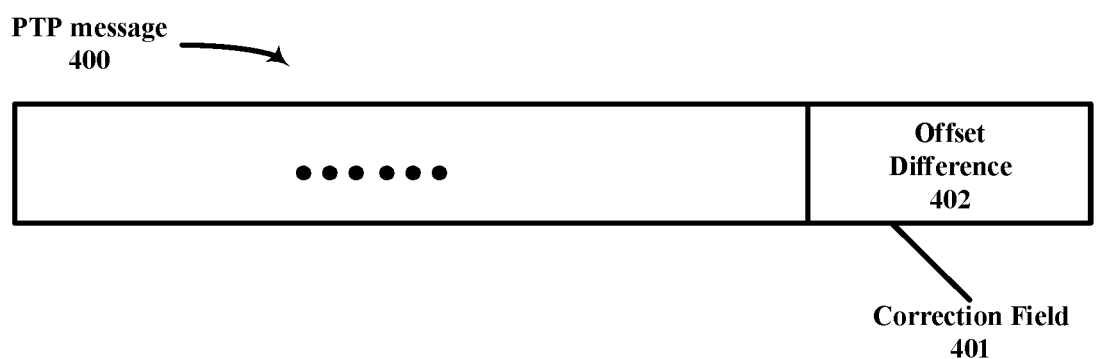
FIG. 4 is a block diagram showing an output message for the second clock signal.

FIG. 4 is a block diagram showing an output message for the second clock signal. As shown in FIG. 4, in embodiments of the present disclosure, the output message comprises: a Precision Time Protocol (PTP) message 400. The offset difference 402 is included in a Correction Field 401 of the PTP message 400.

In embodiments of the present disclosure, the information about the second clock signal (not shown in FIG. 4) indicates a phase value of the second clock signal. The phase value may also be referred as a time value, a time stamp value, etc.

According to embodiments of the present disclosure, the PTP is applied, and information about the offset difference is added in a Correction Field 401 of the PTP message 400. No extra processing or resource are needed.

The PTP message 400 may comprises any one of: a Sync message, a Follow_Up message, a Delay_Resp message, etc. Sync refers to Synchronization, and Resp refers to response.

Figure 5:
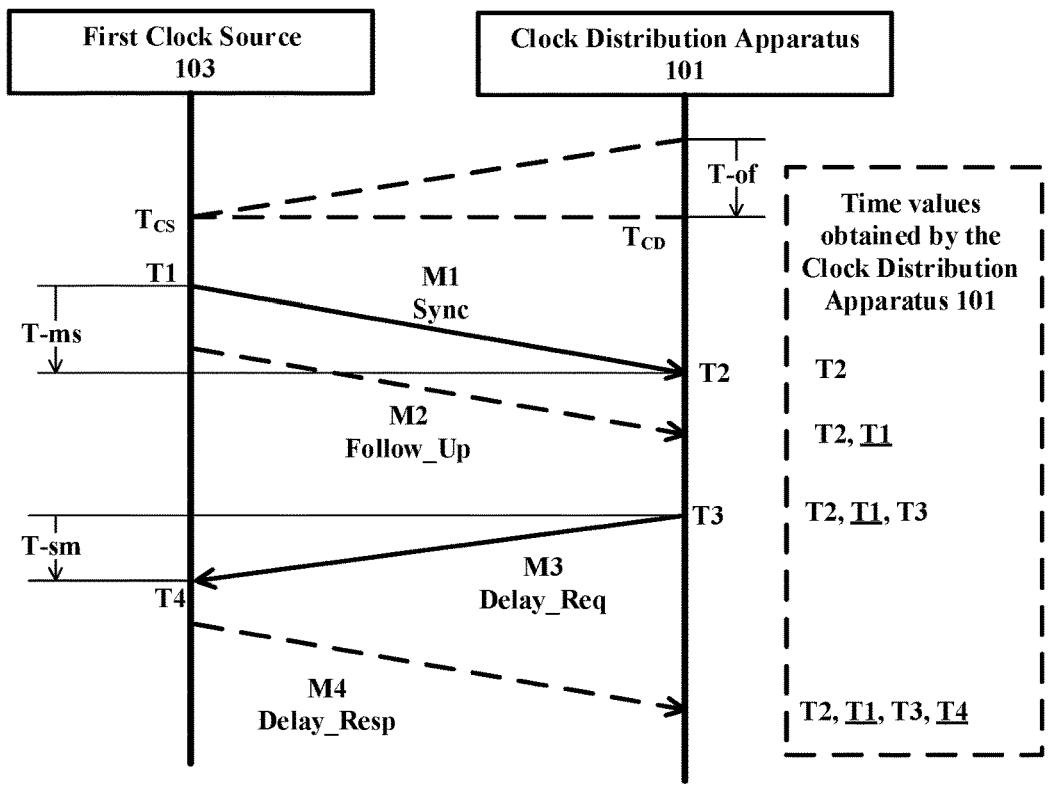
FIG. 5 is an exemplary time line showing a manner to obtain an offset.

FIG. 5 is an exemplary time line showing a manner to obtain an offset. The offset is phase offset caused by the transmission delay. In such situation, the offset difference comprises: a phase offset difference, namely, the phase gap caused by the different transmission delays on different transmission path.

As shown in FIG. 5, the first clock source 103 sends a message M1, such as a Sync message, at time T1. The clock distribution apparatus 101 receives the message M1 from the first clock source 103, and records a time stamp T2. The clock distribution apparatus 101 may obtain the time stamp T1 from the message M1, or from another message M2, such as a Follow_Up message. Then, the clock distribution apparatus 101 sends a message M3, such as a Delay_Req message, at time T3. Req refers to request. The first clock source 103 receives the message M3 at time T4. The first clock source 103 sends another message M4, such as a Delay_Resp message to inform the clock distribution apparatus 101 about the time stamp T4. The transmission delay may be calculated by: (T-ms+T-sm)/2=((T2−T1)+(T4−T3))/2, for example when the transmission delay from the first clock source 103 to the clock distribution apparatus 101 and the transmission delay from the clock distribution apparatus 101 to the first clock source 103 can be treated as the same.

It should be understood that another parameter affecting the phase offset may also be calculated according to FIG. 5. The parameter (T-of) is an error/offset between a local DateTime value of the clock distribution apparatus 101, and a DateTime value of the first clock source 103. For example, in the same actual time point, the local DateTime value of the clock distribution apparatus may be "6:00.000 am" ($T_{CS}$), however, the DateTime value of the first clock source 103 may be "6:00.001 am ($T_{CD}$)". The error/offset of the DateTime values may be calculated by: (T-sm−T-ms)/2= ((T4−T3)−(T2−T1))/2. However, such error/offset of the DateTime values may be eliminated easily by adjusting the local DateTime value of the clock distribution apparatus 101. Therefore, the influence of such error/offset of the DateTime values to the phase offset will be eliminated.

In the FIG. 5, T1, T4 are underlined, as they have value recorded by the first clock source 103 under the clock of the first clock source 103. T2, T3 are not underlined, as they have value recorded by the clock distribution apparatus 101 under the local clock of the clock distribution apparatus.

Therefore, the clock distribution apparatus 101 obtains a first phase offset of the first clock signal, caused by the transmission delay. With the same manner, the clock distribution apparatus 101 obtains a second phase offset of the second clock signal.

Such manner may also be named as delay request-response mechanism. It should be understood, any other manner, such as peer delay mechanism, may also be applied, as long as it can obtain a transmission delay on the transmission path.

In embodiments of the present disclosure, the first clock signal may be from a third clock source 107 through a first transmission path 105 in a network; the second clock signal is from the third clock source 107 through a second transmission path 106 in the network.

The transmission delay (T-delay-down) from the first clock source 103 to the clock distribution apparatus 101 and the transmission delay (T-delay-up) from the clock distribution apparatus 101 to the first clock source 103 may have too big difference to be treated as the same.

There may be a relationship between any $T_{CS}$ and corresponding $T_{CD}$: $T_{CD}=T_{CS}$+T-o.

Thus, T2=T1+T-of +T-delay-down; T4=T3−T-of +T-delay-up.

Thus, T-of =(T2−T1−T4+T3)/2+(T-delay-up−T-delay-down)/2.

As an example without limitation, as to the first transmission path 105, T-delay-down=T-delay-up=20 ns. However, as to the second transmission path 106, T-delay-down=10 ns, T-delay-up=2000 ns.

When the first transmission path 105 is down due to node restart or release upgrade, the PTP packets stream from the first clock source 103 will switch to the second transmission path 106. But the second transmission path 106 has the different network load in downstream and upstream, so the T-delay-down/T-delay-up. This delay will immediately take effect on the passed PTP packets.

The clock distribution apparatus 101 may calibrate its phase/time to the first clock source 103 via the second transmission path 106, and will involve an about 1000 ns phase gap (the difference of T-of of different transmission paths). The phase gap will be distributed to its downstream, such as downstream apparatus 102 as shown in FIG. 1.

The downstream apparatus 102 will be effected with such phase jump, even it is synchronizing to the first clock source 103 all the time.

Figure 6A:
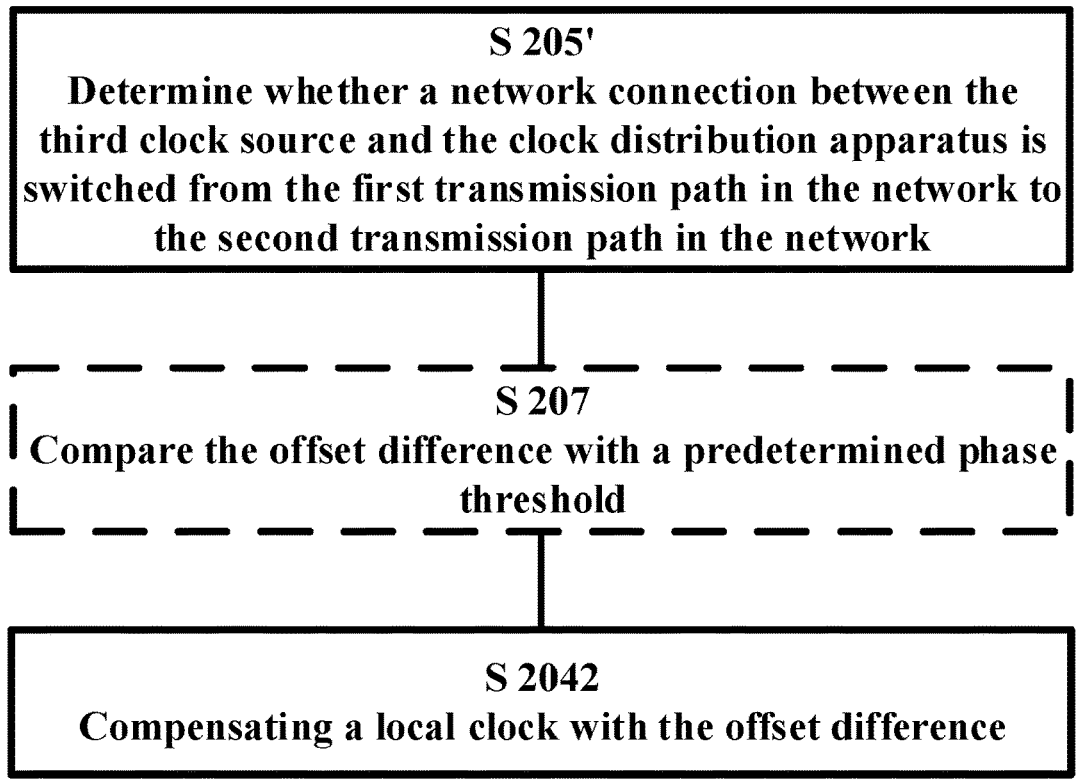
FIG. 6A is another exemplary flow chart showing exemplary substeps of method as shown in FIG. 2.

FIG. 6A is another exemplary flow chart showing exemplary substeps of method as shown in FIG. 2.

As shown in FIG. 6A, the method may further comprise: step S205', determining whether a network connection between the third clock source and the clock distribution apparatus is switched from the first transmission path in the network to the second transmission path in the network.

In embodiments of the present disclosure, the step S204, compensating the second clock signal, based on the offset difference may comprise: step S2042, compensating a local clock with the offset difference, when it is determined that the network connection between the third clock source and the clock distribution apparatus is switched from the first transmission path in the network to the second transmission path in the network.

In embodiments of the present disclosure, it is determined that the network connection between the third clock source and the clock distribution apparatus is switched from the first transmission path in the network to the second transmission path in the network, when the first transmission path in the network is not valid and the second transmission path in the network is stable during a predetermined time period.

According to embodiments of the present disclosure, the difference between T-of in different transmission path (such as about 1000 ns phase gap described above) will be calculated and used to compensate the local clock of the clock distribution apparatus 101. Namely, each "$T_{CD}$" recorded by the clock distribution apparatus 101 will be adjusted accordingly thereafter.

For example, the local clock is adjusted by 1000 ns (plus or minus). Then, the adjusted value is record in field "originTimestamp" in PTP packet. The processing procedure is just the same as before being adjusted. The downstream apparatus feels no change of "offset".

Optionally, the method may further comprise: step S207, comparing the offset difference with a predetermined threshold. The local clock is compensated with the offset difference, when it is determined that the network connection between the third clock source and the clock distribution apparatus is switched from the first network transmission path to the second network transmission path and the offset difference is bigger than the predetermined threshold.

According to embodiments of the present disclosure, the local clock is compensated with the offset difference when the offset difference is bigger than the predetermined threshold, so as to ignore minor offset difference which may be acceptable to the downstream apparatuses. Any offset difference exceeding such predetermined threshold may be compensated, such as to be zero.

Further, this threshold may be considered as a standard, an offset difference exceeding this threshold only needs to be compensated to be equal to or less than this threshold, rather than to be compensated to be zero. The requirement about calculation or the capability for the clock distribution apparatus to make compensation may be reduced. This predetermined compensation threshold may also be configured by any authorized user.

Further, according to embodiments of the present disclosure, the local clock may be compensated with the offset difference when the offset difference is less than another predetermined upper threshold for compensation, so as not to go beyond an adjustment capability of the local clock of the clock distribution apparatus. This predetermined upper threshold for compensation may also be configured by any authorized user. Particularly, the upper threshold may be a rather big value, and when this upper threshold is exceeded, it may be considered that failures occurs in transmission path or any relating apparatus in network (including the clock distribution apparatus itself). This predetermined upper threshold for compensation may also be configured according to a capability of the local clock or by any authorized user.

Namely, according to embodiments of the present disclosure, the local clock may be compensated with the offset difference when the offset difference is bigger than a predetermined threshold, and less than another predetermined upper threshold for compensation.

Figure 6B:
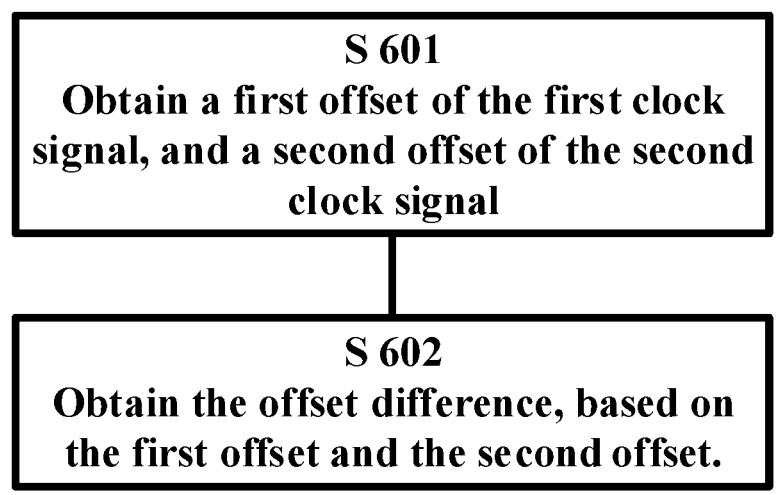
FIG. 6B is another exemplary flow chart showing exemplary substeps of method as shown in FIG. 2.

FIG. 6B is another exemplary flow chart showing exemplary substeps of method as shown in FIG. 2. As shown in FIG. 6, calculating the offset difference between the first clock signal and the second clock signal comprises: S601, obtaining a first offset of the first clock signal, and a second offset of the second clock signal; and S602, obtaining the offset difference, based on the first offset and the second offset.

In step S601, any manner, such as delay request-response mechanism, peer delay mechanism, etc., may be applied. In step S602, a simple numerical difference may be obtained. For example, an offset difference may equal to (the second offset–the first offset). When the first offset is 20 ns, the second offset is 2000 ns, the offset difference may be 1980 ns. A plus sign of the offset difference may mean the delay of the second clock signal is larger than the first clock signal.

According to embodiments to the present disclosure, a simple numerical difference may be applied for the offset difference. It is convenient for the downstream apparatus 102 to analyze the out message received from the clock distribution apparatus 101.

Figure 7:
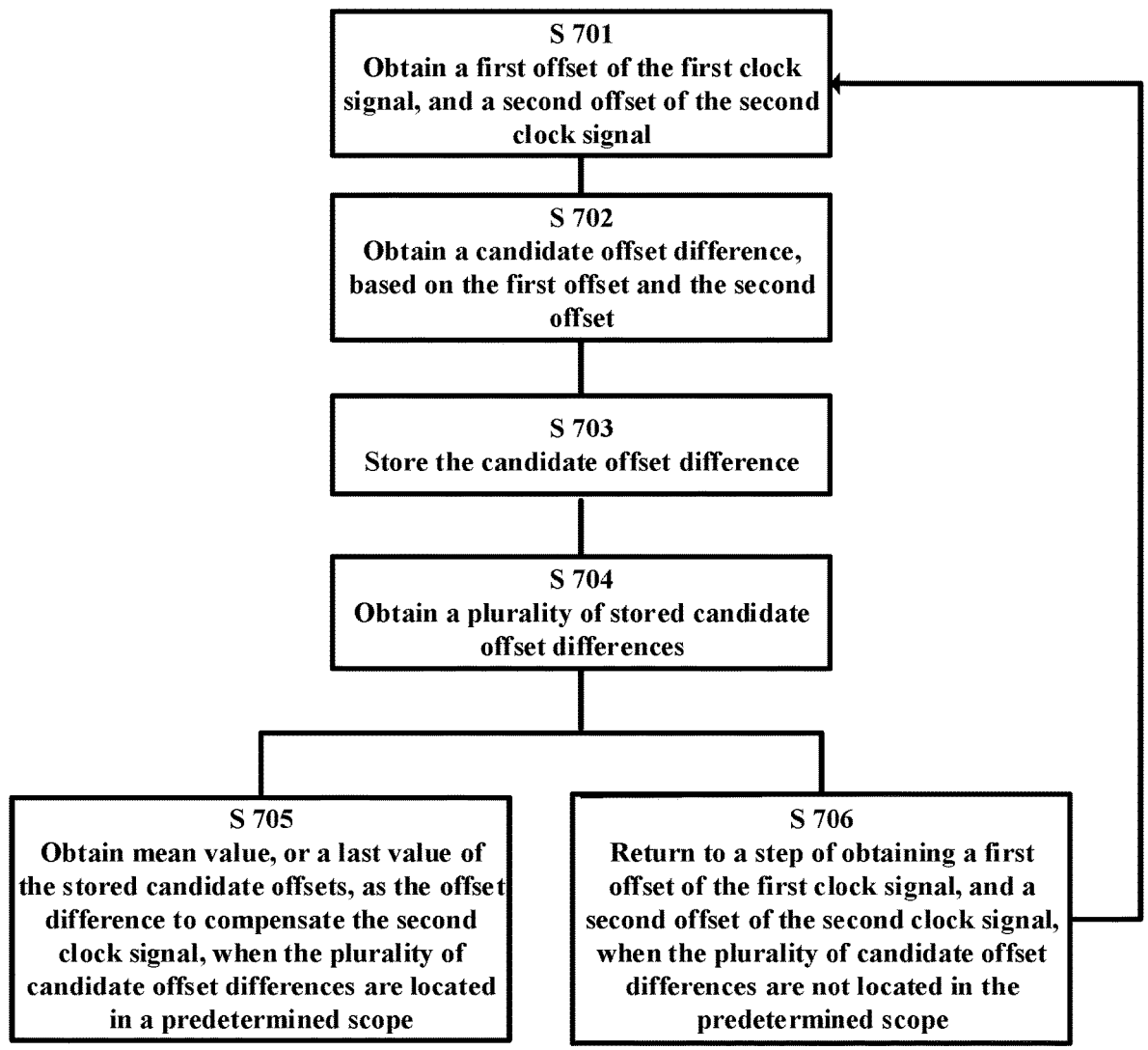
FIG. 7 is another exemplary flow chart showing exemplary sub steps of method as shown in FIG. 2.

FIG. 7 is another exemplary flow chart showing exemplary sub steps of method as shown in FIG. 2. As shown in FIG. 7, calculating the offset difference between the first clock signal and the second clock signal comprises: S701, obtaining a first offset of the first clock signal, and a second offset of the second clock signal; S702, obtaining a candidate offset difference, based on the first offset and the second offset; S703, storing the candidate offset difference; S704, obtaining a plurality of stored candidate offset differences; S705, obtaining a mean value, or a last value of the stored candidate offsets, as the offset difference to compensate the second clock signal, when the plurality of candidate offset differences are located in a predetermined scope; and S706, returning to a step of obtaining a first offset of the first clock signal, and a second offset of the second clock signal, when the plurality of candidate offset differences are not located in the predetermined scope.

According to the embodiments of the present disclosure, the offset difference may be calculated repeatedly, until that a value is stabilized, namely, when the first offset and the second offset is stabilized. The influence of the fluctuations of the first network transmission path 105 and the second network transmission path 106 may be reduced.

Figure 8:
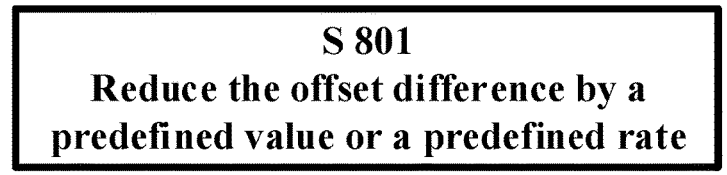
FIG. 8 is an exemplary flow chart showing other steps of method as shown in FIG. 2.

FIG. 8 is an exemplary flow chart showing other steps of method as shown in FIG. 2. As shown in FIG. 8, the method further comprises: S801, reducing the offset difference by a predefined value or a predefined rate. Accordingly, compensating the second clock signal with the offset difference comprises: compensating the second clock signal with the reduced offset difference.

In embodiments of the present disclosure, the predefined value is configurable.

According to embodiments of the present disclosure, the offset difference included in the output message may be reduced to zero, step by step. A smooth switching from the first clock signal to the second clock signal may be achieved during a configurable time period. The operation of the downstream apparatus 102 will not be affected, during or after the switching.

For example, firstly, 1980 ns may be applied as the offset difference. Then, after a configurable period (e.g. one minute), 1880 ns is applied. In such manner, the offset difference is reduced to zero, step by step.

Figure 9:
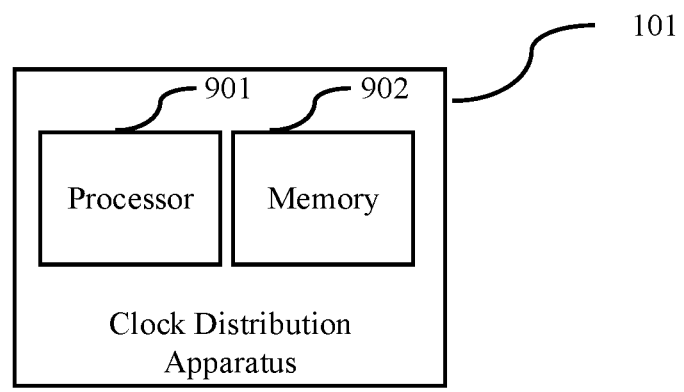
FIG. 9 is a block diagram showing a clock distribution apparatus in accordance with embodiments of the present disclosure.

FIG. 9 is a block diagram showing a clock distribution apparatus in accordance with embodiments of the present disclosure. As shown in FIG. 9, the clock distribution apparatus, comprises a processor 901; and a memory 902, containing instructions executable by the processor 901. The clock distribution apparatus 101 is operative to: receive (S201) a first clock signal from a first clock source; receive (S202) a second clock signal from a second clock source; calculate (S203) an offset difference between the first clock signal and the second clock signal; compensate (S204) the second clock signal with the offset difference; determine (S205) to switch from the first clock source to the second clock source; and output (S206) the compensated second clock signal.

The processor 901 may be any kind of processing component, such as one or more microprocessor or microcontrollers, as well as other digital hardware, which may include digital signal processors (DSPs), special-purpose digital logic, and the like. The memory 902 may be any kind of storage component, such as read-only memory (ROM), random-access memory, cache memory, flash memory devices, optical storage devices, etc.

In embodiments of the present disclosure, the clock distribution apparatus 101 is further operative to implement any method above mentioned, such as shown in FIGS. 3, 6, 7, 8.

For example, the clock distribution apparatus is further operative to: generate (S2041) an output message including information about the second clock signal and the offset difference; and output (S2061) the output message.

For example, the clock distribution apparatus is further operative to: obtain (S601) a first offset of the first clock signal, and a second offset of the second clock signal; and obtain (S602) the offset difference, based on the first offset and the second offset.

For example, the clock distribution apparatus is further operative to: obtain (S701) a first offset of the first clock signal, and a second offset of the second clock signal; obtain (S702) a candidate offset difference, based on the first offset and the second offset; store (S703) the candidate offset difference; obtain (S704) a plurality of stored candidate offset differences; obtain (S705) a mean value, or a last value of the stored candidate offsets, as the offset difference to compensate the second clock signal, when the plurality of candidate offset differences are located in a predetermined scope; and return (S706) to a step of obtaining a first offset of the first clock signal, and a second offset of the second clock signal, when the plurality of candidate offset differences are not located in the predetermined scope.

For example, the clock distribution apparatus is further operative to: reduce (S801) the offset difference by a predefined value or a predefined rate; and compensate the second clock signal with the reduced offset difference.

In embodiments of the present disclosure, the clock distribution apparatus comprises: a boundary clock apparatus.

In embodiments of the present disclosure, the boundary clock apparatus comprises: a Partial-Support Telecom Boundary Clock (T-BC-P) apparatus.

In embodiments of the present disclosure, the first clock source comprises: a Grandmaster (GM) apparatus. The second clock source comprises: a Grandmaster (GM) apparatus.

According to embodiments of the present disclosure, the second clock signal is not directly transferred by the clock distribution apparatuses 101. The offset difference between the first clock signal and the second clock signal is calculated and used to compensate the second clock signal. Then, the compensated second clock signal is transferred to the downstream apparatus 102.

For example, the phase jump may be detected and compensated in the clock distribution apparatuses 101. The downstream apparatus 102 may not be affected by the phase jump.

Figure 10A:
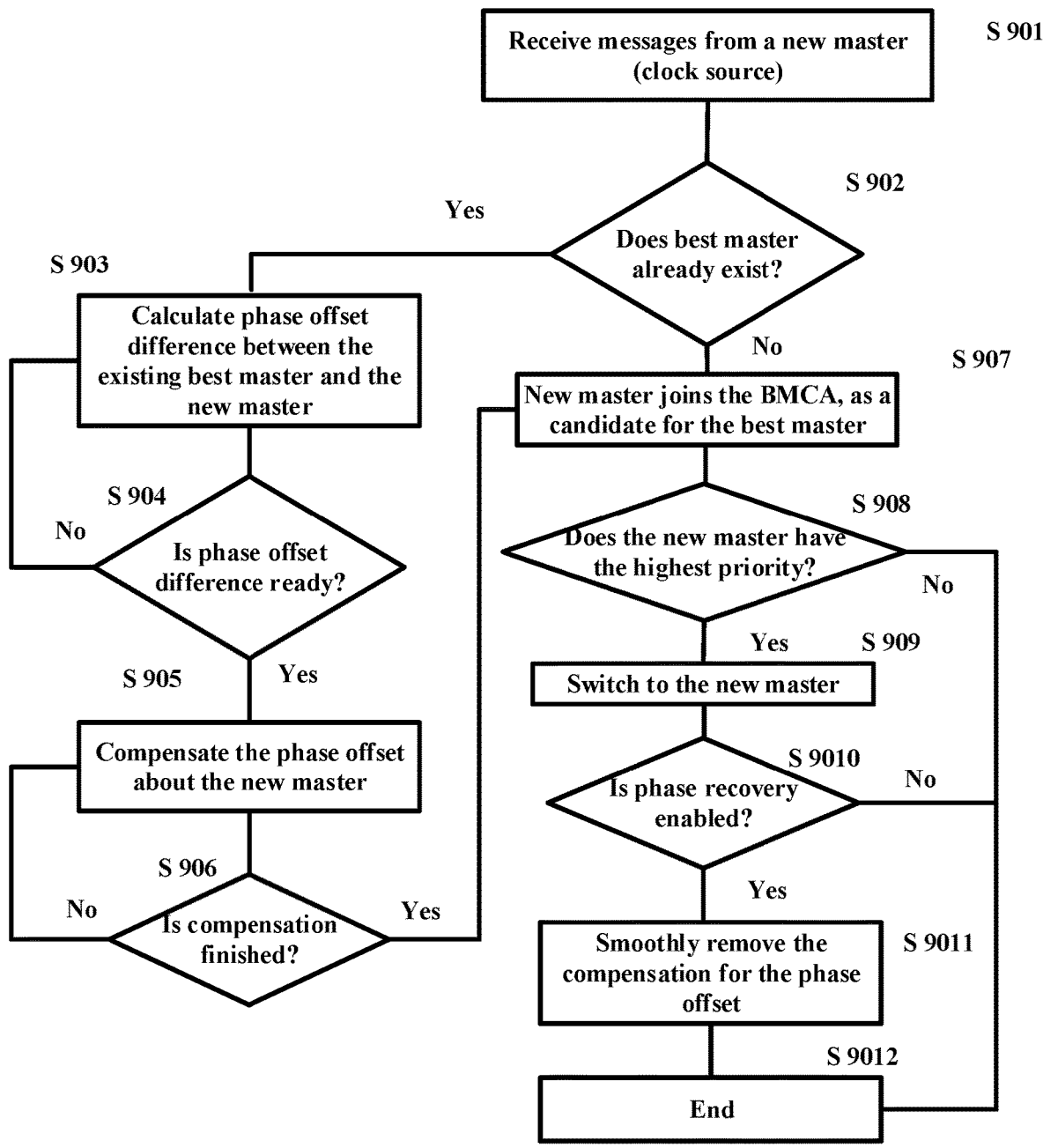
FIG. 10A is an exemplary flow chart showing a method performed in the clock distribution apparatus in accordance with embodiments of the present disclosure.

FIG. 10A is an exemplary flow chart showing a method performed in the clock distribution apparatus in accordance with embodiments of the present disclosure.

As shown in FIG. 10, in step S901, the clock distribution apparatus receives messages from a new master (namely, a new clock source).

In step S902, the clock distribution apparatus determines whether a best master already exist. If yes, the clock distribution apparatus performs the step S903. If no, the clock distribution apparatus performs the step S907.

In step S903, the clock distribution apparatus calculates a phase offset difference between the existing best master and the new master. Namely, the existing best master is the first clock source, and the new master is the second clock source.

In step S904, it is determined whether the phase offset difference is ready or not. If yes, the step S905 is performed. If no, the clock distribution apparatus returns to step S903.

In step S905, the phase offset about the new master is compensated, namely, the second clock signal from the new master is compensated with the phase offset difference.

In step S906, it is determined whether the compensation is finished or not. If yes, the step S907 is performed. If no, the clock distribution apparatus returns to step S905.

In step S907, the clock distribution apparatus records the new master as joining the BMCA, namely, as a candidate for the best master.

In step S908, it is determined whether the compensation is finished or not. If yes, the step S909 is performed. If no, the clock distribution apparatus jumps to step S9012.

In step S909, the clock distribution apparatus switches to the new master.

In step S9010, it is determined whether the phase recovery is enabled or not. If yes, the step S9011 is performed. If no, the clock distribution apparatus jumps to step S9012.

In step S9011, the clock distribution apparatus smoothly removes the compensation for the phase offset, namely, recedes the phase offset difference by a predefined value or a predefined rate.

In step S9012, the method may end.

According to embodiments of the present disclosure, smooth switching to the new master (clock source) may be achieved, no matter the best master is already exists or not.

Figure 10B:
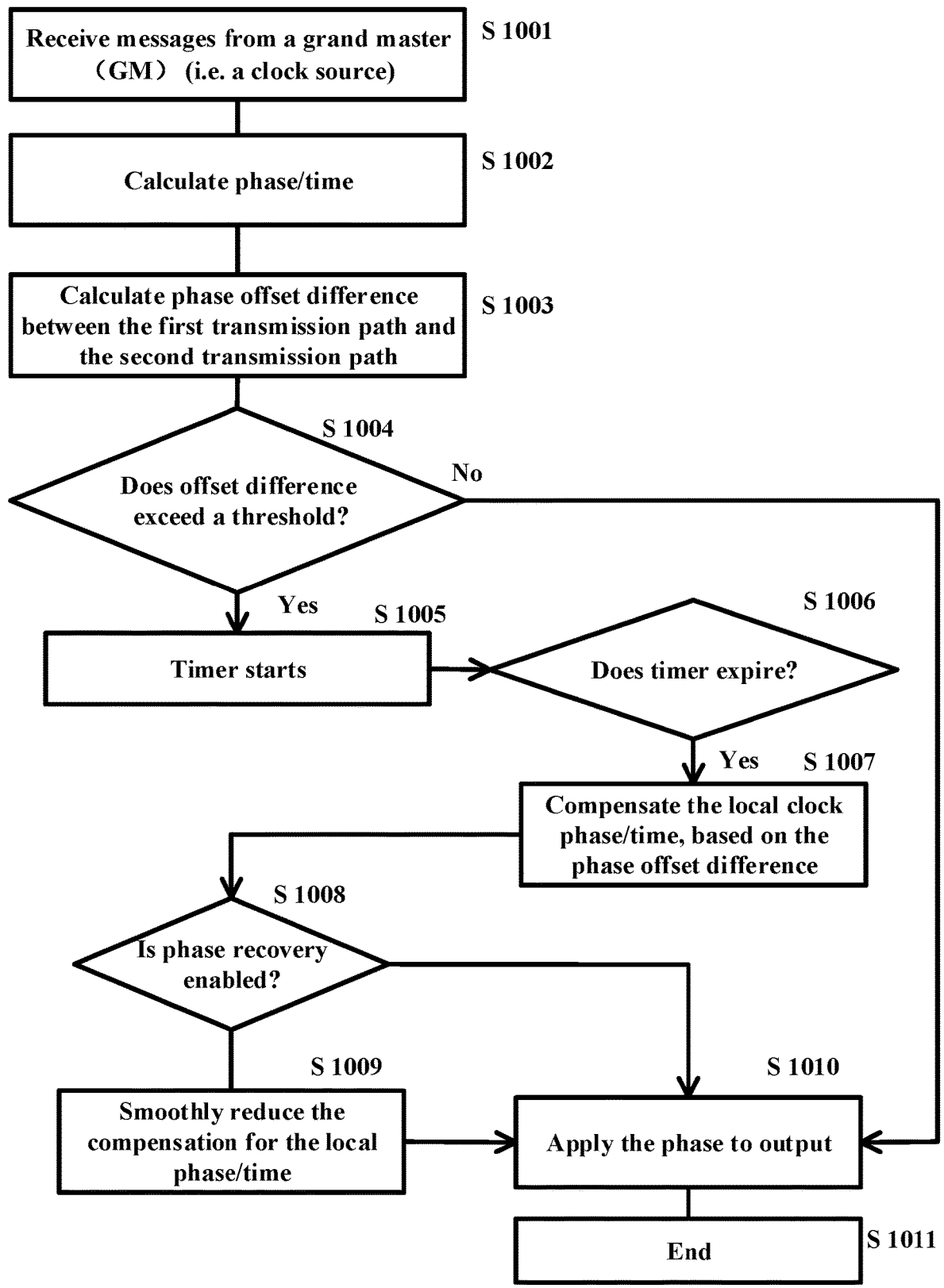
FIG. 10B is an exemplary flow chart showing a method performed in the clock distribution apparatus in accordance with embodiments of the present disclosure.

FIG. 10B is another exemplary flow chart showing a method performed in the clock distribution apparatus in accordance with embodiments of the present disclosure.

In step S1001, the clock distribution apparatus 101 may receive clock signals from the third clock source 107, including the first clock signal from through the first transmission path 105, and the second clock signal from through the second transmission path 106.

In step S1002, the clock distribution apparatus 101 may calculate phase/time parameters relating to the first clock signal and the second clock signal.

In step S1003, the clock distribution apparatus 101 may calculate the phase difference between the first clock signal through the first transmission path 105 and the second clock signal through the second transmission path 106.

In step S1004, the clock distribution apparatus 101 may determine whether the offset difference exceed threshold (such as the predetermined threshold above described). If "Yes", then the clock distribution apparatus 101 may go to step S1005. If "No", then the clock distribution apparatus 101 may go to step S1010. Particularly, an absolute value of the offset difference may be used to be compared with a positive threshold, when it is possible for the offset difference to be positive or negative. If the absolute value of the offset difference is bigger than the positive threshold (such as the above predetermined threshold), it is considered that the clock distribution apparatus 101 needs to compensate the local clock. Further, another predetermined upper threshold above described may also be utilized, even it is not shown in FIG. 10B.

In step S1005, a timer (such as a simulate timer) starts. Before the timer expires, the clock distribution apparatus 101 should check the phase offset is stable or not, but not apply the phase offset difference to the local clock, and/or on the output.

In embodiments of the present disclosure, if the phase offset difference is flapping (jumping in and out of the range of the thresholds, or jumping up and down comparing to the predetermined threshold). The timer should be restarted.

In step S1006, the clock distribution apparatus 101 may determine whether the timer expires. If yes, then the clock distribution apparatus 101 may go to step S1007.

In step S1007, the clock distribution apparatus 101 may compensate the local phase/time, based on the phase offset difference.

In step S1008, the clock distribution apparatus 101 may determine whether the phase recovery is enabled or not. If yes, the step S1009 is performed. If no, the clock distribution apparatus 101 jumps to step S1010.

In step S1009, the clock distribution apparatus 101 smoothly removes the compensation for the local clock. Namely, the clock distribution apparatus 101 recedes the value of phase offset difference for compensation by a predefined value or a predefined rate. For example, the 1000 ns offset difference may be reduced by 100 ns per minute.

In step S1010, the clock distribution apparatus 101 output a clock signal, with/without the compensation based on the offset difference.

In step S1011, the method may end.

Figure 11:
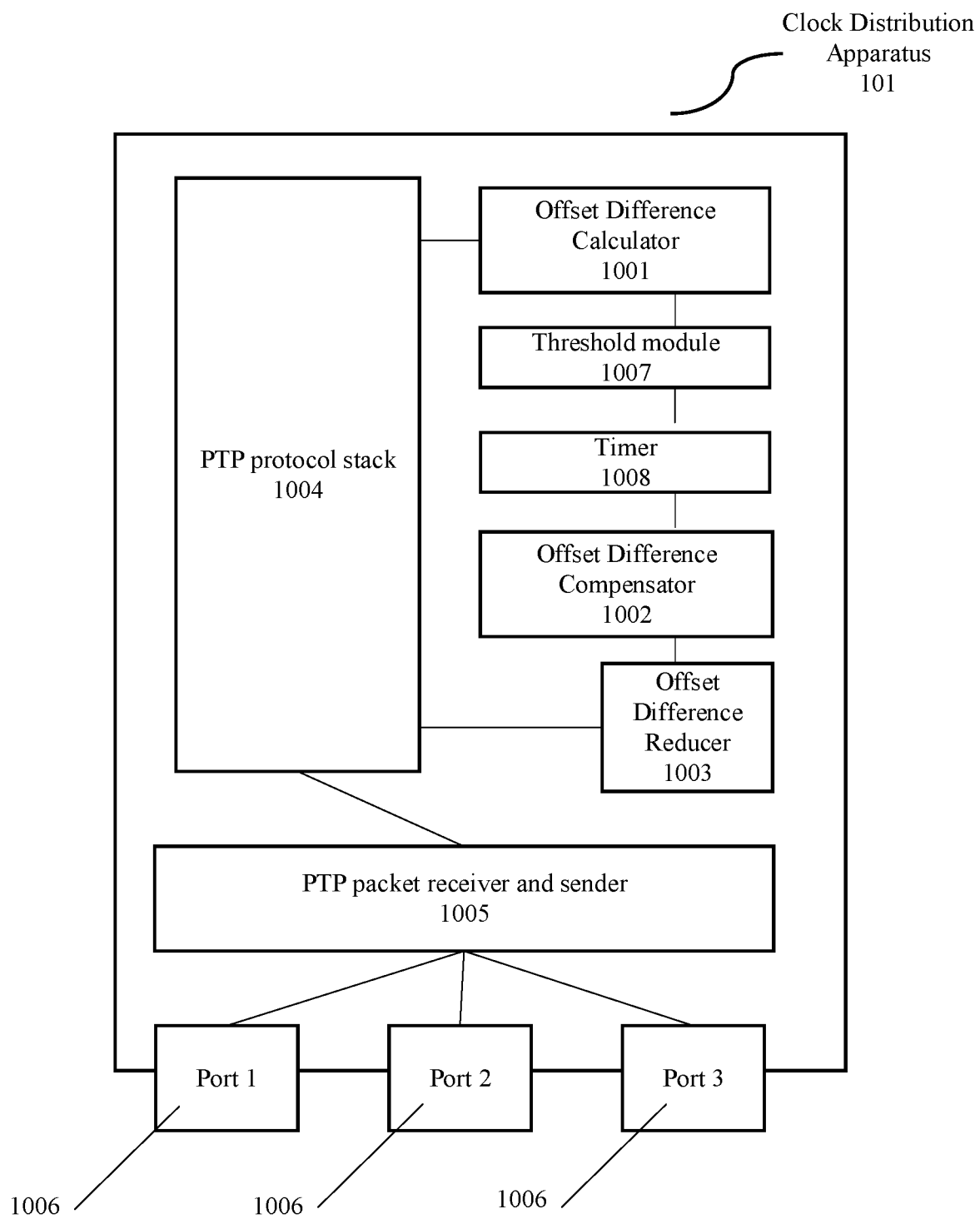
FIG. 11 is a block diagram showing function units of a clock distribution apparatus in accordance with embodiments of the present disclosure.

FIG. 11 is a block diagram showing function units of a clock distribution apparatus in accordance with embodiments of the present disclosure. As shown in FIG. 10, the clock distribution apparatus 101 may comprise: an offset difference calculator 1001, an offset difference compensator 1002. The offset difference calculator 1001 may be configured to calculate (S203) an offset difference between the first clock signal and the second clock signal. The offset difference compensator 1002 may be configured to compensate (S204) the second clock signal with the offset difference.

The offset difference calculator 1001 is a main function and triggers another module to work. It is also the interface interact with the PTP Algorithm.

The offset difference calculator 1001 may obtain each PTP packets timestamp information, and calculate the phase offset.

The offset difference compensator 1002 may be triggered by timer expired event. The offset difference compensator 1002 may compensate the phase offset on local clock, and local clock will distribute the compensated phase to the downstream.

The first clock signal and the second clock signal may be firstly received by the PTP packet receiver and sender 1005 via any port 1006. Namely, the PTP packet receiver and sender 1005 may be configured to receive (S201) a first clock signal from a first clock source; and receive (S202) a second clock signal from a second clock source.

The PTP protocol stack 1004 is configured to implement PTP protocol. For example, the PTP protocol stack 1004 is configured to determine (S205) to switch from the first clock source to the second clock source. And then, the PTP packet receiver and sender 1005 is further configured to output (S206) the compensated second clock signal.

The clock distribution apparatus 101 may further comprise: an offset difference reducer 1003, configured to reduce (S801) the offset difference by a predefined value or a predefined rate.

The clock distribution apparatus 101 may further comprise: a threshold module 1007. The threshold module 1007 may obtain the phase offset difference from Phase Offset difference Calculator, and then check whether the Phase Offset difference exceeds the threshold(s) or not. For example, the threshold module 1007 may check whether the Phase Offset is bigger than a predetermined threshold above described, and/or whether the Phase Offset is less than another predetermined upper threshold above described. The threshold module 1007 may receive the threshold configuration for defining the threshold value(s).

The clock distribution apparatus 101 may further comprise: a timer 1008. The timer 1008 may be triggered by Threshold module 1007. Before the timer 1008 expired, the local clock should check whether the phase offset is stable or not, but not apply the phase offset on the output (namely, not compensate the local clock).

These function unit may have conventional arrangement in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

As to the architecture according to ITU-T G.8275.2 profile, if there exists PTP Slave port, the other non-slave PTP ports monitors the GM (if it exists) phase/time via the PTP packets. The phase offset calculator and compensator will apply to the non-slave PTP ports. If one of the PTP ports connects to the new GM with higher priority, the T-BC-P will not switchover to the new GM immediately. Firstly, this PTP port monitors phase/time via the PTP packets, then the phase offset calculator and compensator figure out the phase gap and compensates the offset into the packets stream. Finally, the BMCA will be triggered and the PTP port will become Slave. As the result, the downstream will never see the phase jump suddenly, just it will get a smooth curve of the phase.

Take T-BC-P for example, one PTP port should be slave, it now locked to a GM. And one or more regular PTP ports could also be configured for backup purpose. But they will be non-slave state and wait for the result of calculator and compensator to trigger the BMCA to re-choose the slave port.

Figure 12:
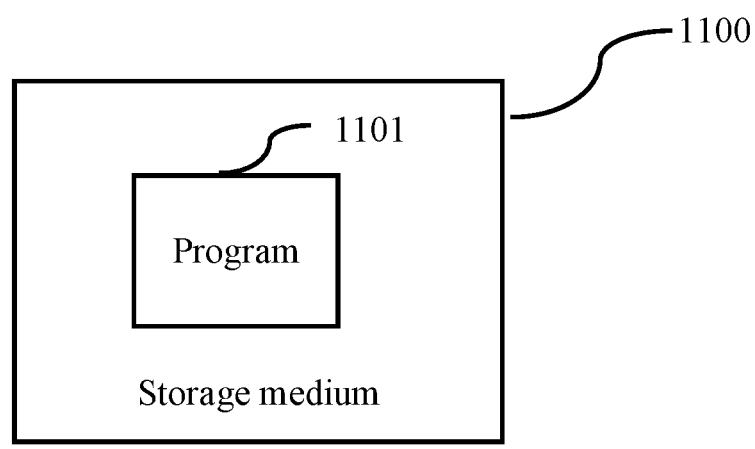
FIG. 12 is a block diagram showing a computer readable storage medium in accordance with embodiments of the present disclosure.

FIG. 12 is a block diagram showing a computer readable storage medium in accordance with embodiments of the present disclosure. As shown in FIG. 11, a computer readable storage medium 1100 having a computer program 1101 stored thereon, the computer program 1101 executable by a device to cause the device to carry out any method above mentioned, such as shown in FIGS. 2, 3, 6, 7, 8.

The computer readable storage medium 1100 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

According to embodiments of the present disclosure, the second clock signal is not directly transferred by the clock distribution apparatuses 101. The offset difference between the first clock signal and the second clock signal is calculated and used to compensate the second clock signal. Then, the compensated second clock signal is transferred to the downstream apparatus 102.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method performed at a clock distribution apparatus, comprising:
receiving a first clock signal;
receiving a second clock signal;
calculating an offset difference between the first clock signal and the second clock signal;
compensating the second clock signal, based on the offset difference, wherein compensating the second clock signal, based on the offset difference, comprises compensating a local clock with the offset difference, in response to determining that a network connection between a third clock source and the clock distribution apparatus is switched from a first network transmission path to a second network transmission path;
outputting a clock signal, based on the compensated second clock signal wherein the first clock signal is from the third clock source through a first network transmission path and wherein the second clock signal is from the third clock source through a second network transmission path; and
determining whether the network connection between the third clock source and the clock distribution apparatus is switched from the first network transmission path to the second network transmission path.

2. The method according to claim 1,
wherein the first clock signal is from a first clock source;
wherein the second clock signal is from a second clock source;
wherein the method further comprises:
determining to switch from the first clock source to the second clock source;
wherein compensating the second clock signal, based on the offset difference comprises:
generating an output message including information about the second clock signal and the offset difference; and
wherein outputting the clock signal, based on the compensated second clock signal, comprises:
outputting the output message.

3. The method according to claim 2,
wherein the information about the second clock signal indicates a phase value of the second clock signal.

4. The method according to claim 2,
wherein the output message comprises: a Precision Time Protocol (PTP) message; and
wherein the offset difference is included in a Correction Field of the PTP message.

5. The method according to claim 1,
wherein it is determined that the network connection between the third clock source and the clock distribution apparatus is switched from the first network transmission path to the second network transmission path, when the first network transmission path is not valid and the second network transmission path is stable during a predetermined time period.

6. The method according to claim 1, further comprising:
comparing the offset difference with a predetermined threshold; and
wherein the local clock is compensated with the offset difference, when it is determined that the network connection between the third clock source and the clock distribution apparatus is switched from the first network transmission path to the second network transmission path and the offset difference is bigger than the predetermined threshold.

7. The method according to claim 1,
wherein calculating the offset difference between the first clock signal and the second clock signal comprises:
obtaining a first phase offset of the first clock signal, and a second phase offset of the second clock signal; and
obtaining the offset difference, based on the first phase offset and the second phase offset.

8. The method according to claim 1,
wherein calculating the offset difference between the first clock signal and the second clock signal comprises:
obtaining a first phase offset of the first clock signal, and a second phase offset of the second clock signal;
obtaining a candidate offset difference, based on the first phase offset and the second phase offset;
storing the candidate offset difference;
obtaining a plurality of stored candidate offset differences;
obtaining a mean value, or a last value of the plurality of stored candidate offset differences, as the offset difference to compensate the second clock signal, when the plurality of stored candidate offset differences are located in a predetermined scope; and
returning to a step of obtaining the first phase offset of the first clock signal, and the second phase offset of the second clock signal, when the plurality of stored candidate offset differences are not located in the predetermined scope.

9. The method according to claim 1, further comprising:
reducing the offset difference by a predefined value or a predefined rate; and
wherein compensating the second clock signal with the offset difference comprises:
compensating the second clock signal with the reduced offset difference.

10. The method according to claim 9, wherein the predefined value is configurable.

11. The method according to claim 1, wherein the offset difference comprises: a phase offset difference; and optionally,
wherein the clock distribution apparatus comprises: a boundary clock apparatus; and
optionally,
wherein the boundary clock apparatus comprises: a Partial-Support Telecom Boundary Clock (T-BC-P) apparatus; and optionally,
wherein a first clock source comprises: a Grandmaster (GM) apparatus; and/or
wherein a second clock source comprises: a apparatus; and optionally,
wherein the clock distribution apparatus determines to switch from the first clock source to the second clock source, based on a Best Master Clock Algorithm (BMCA).

12. A clock distribution apparatus, comprising:
a processor;
a memory, containing instructions executable by the processor; and
wherein the processor is operative to:
receive a first clock signal;
receive a second clock signal;
calculate an offset difference between a first phase offset of the first clock signal and the second clock signal;
compensate the second clock signal, based on the offset difference wherein compensating the second clock signal, based on the offset difference, comprises compensating a local clock with the offset difference, in response to determining that a network connection between a third clock source and the clock distribution apparatus is switched from a first network transmission path to a second network transmission path;
output a clock signal, based on the compensated second clock signal wherein the first clock signal is from the third clock source through the first network transmission path and wherein the second clock signal is from the third clock source through the second network transmission path; and
determine whether the network connection between the third clock source and the clock distribution apparatus is switched from the first network transmission path to the second network transmission path.

13. The clock distribution apparatus according to claim 12:
wherein the first clock signal is from a first clock source;
wherein the second clock signal is from a second clock source;
wherein the processor is further operative to:
determining to switch from the first clock source to the second clock source;
wherein compensating the second clock signal, based on the offset difference comprises:
generating an output message including information about the second clock signal and the offset difference; and
wherein outputting the clock signal, based on the compensated second clock signal, comprises:
outputting the output message.

14. A non-transitory computer readable storage medium having a computer program stored thereon, the computer program executable by a device to cause the device to:
receive a first clock signal;
receive a second clock signal;
calculate an offset difference between the first clock signal and the second clock signal;
compensate the second clock signal, based on the offset difference wherein compensating the second clock signal, based on the offset difference, comprises compensating a local clock with the offset difference, in response to determining that a network connection between a third clock source and a clock distribution apparatus is switched from a first network transmission path to a second network transmission path;
outputting a clock signal, based on the compensated second clock signal wherein the first clock signal is from the third clock source through the first network transmission path and wherein the second clock signal is from the third clock source through the second network transmission path; and
determine whether the network connection between the third clock source and the clock distribution apparatus is switched from the first network transmission path to the second network transmission path.

15. The non-transitory computer readable storage medium of claim 14,
wherein the first clock signal is from a first clock source;
wherein the second clock signal is from a second clock source;
wherein the computer program is further configured to cause the device to:
determine to switch from the first clock source to the second clock source;
wherein compensating the second clock signal, based on the offset difference comprises:
generate an output message including information about the second clock signal and the offset difference; and
wherein to output the clock signal, based on the compensated second clock signal comprises:
outputting the output message.

* * * * *